United States Patent [19]
Pick

[11] 3,789,176
[45] Jan. 29, 1974

[54] DIAPHRAGM SEAL ARRANGEMENT

[75] Inventor: William Albert Pick, Cedarville, Ill.

[73] Assignee: Honeywell, Inc., Minneapolis, Minn.

[22] Filed: Dec. 27, 1971

[21] Appl. No.: 212,027

[52] U.S. Cl. .......................... 200/168 G, 200/83 B
[51] Int. Cl. ............................................ H10h 9/04
[58] Field of Search ...................... 200/168 G, 83 B

[56] References Cited
UNITED STATES PATENTS

| | | | |
|---|---|---|---|
| 3,588,423 | 6/1971 | Hallerberg | 200/168 G |
| 3,144,539 | 8/1964 | Morse | 200/168 G |
| 3,083,278 | 3/1963 | Mukai | 200/168 G X |
| 3,629,535 | 12/1971 | Walters | 200/168 G |
| 3,094,074 | 6/1963 | Tuckey | 200/83 B |
| 3,562,456 | 2/1971 | Rogers | 200/83 B |

*Primary Examiner*—H. O. Jones
*Attorney, Agent, or Firm*—Philip J. Zrimsek

[57] ABSTRACT

A diaphragm seal arrangement where a diaphragm seal is secured in place by a retainer that is snap fastened to a portion of the device with which the diaphragm seal is associated.

4 Claims, 3 Drawing Figures

PATENTED JAN 29 1974 3,789,176
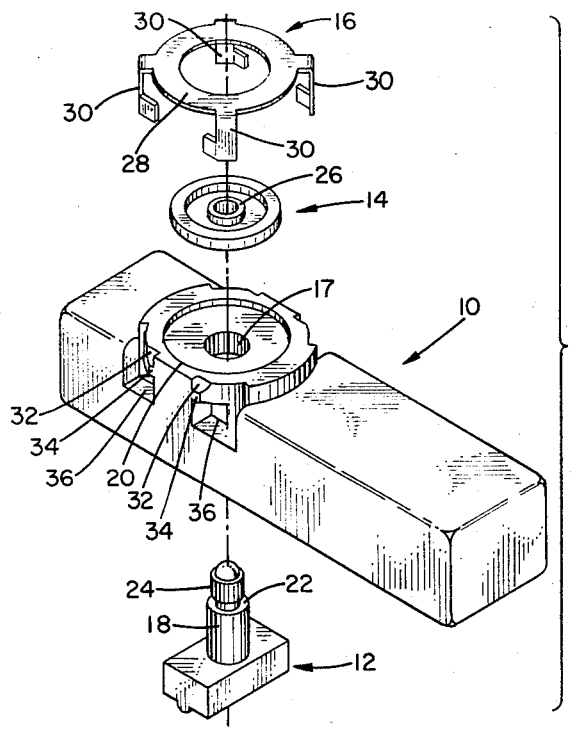
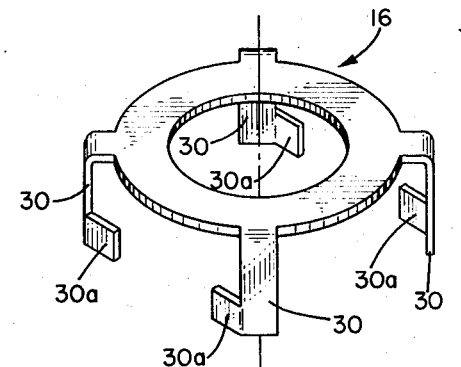
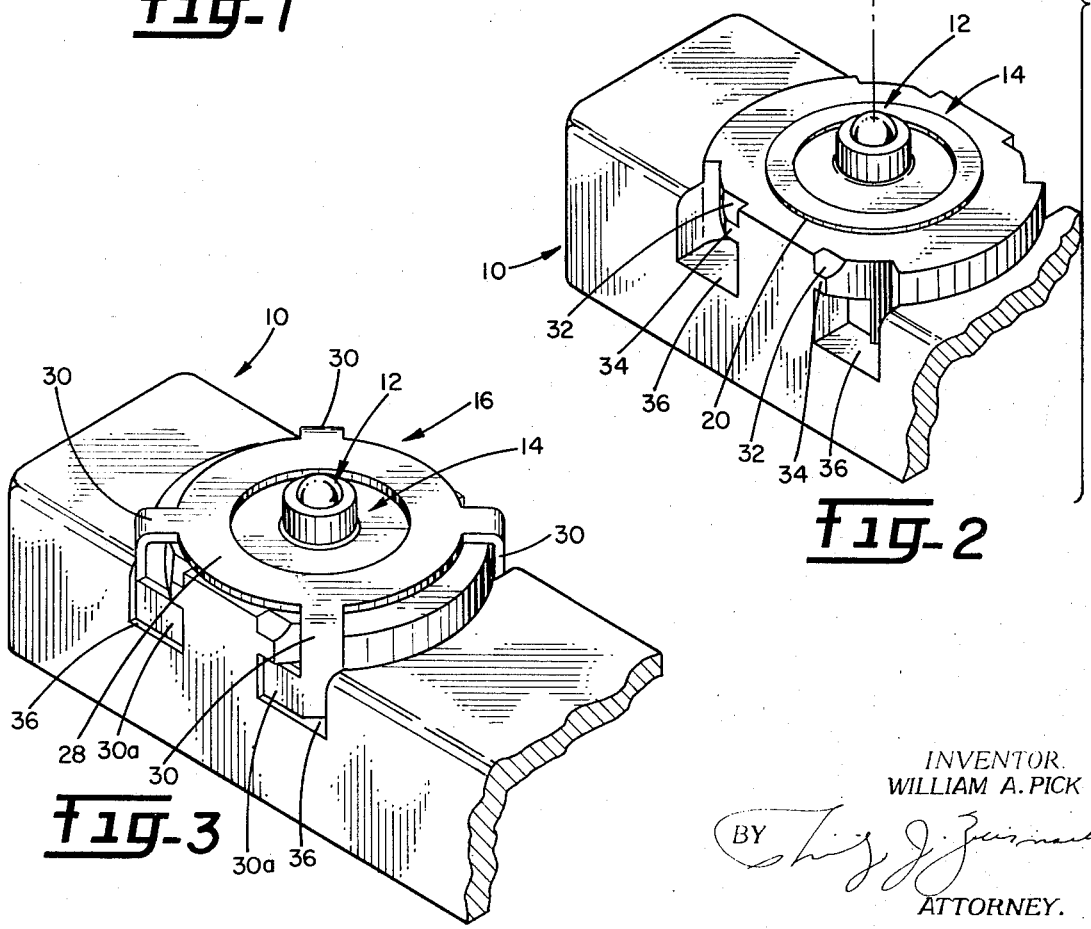
INVENTOR.
WILLIAM A. PICK
BY
ATTORNEY.

DIAPHRAGM SEAL ARRANGEMENT

The present invention is directed to a diaphragm seal arrangement wherein a conventional diaphragm seal is located about an opening to be sealed and is maintained in place by mechanical securing means.

Diaphragm seals are very well-known in the art. In the past any number of approaches have been utilized to maintain such diaphragm seals in place. Conventionally, adhesive bonding, screw fasteners, and contraction and expansion rings have found favor. Adhesive bonding usually requires curing (time and/or heat). Screw fasteners require additional expensive fabrication and rings usually require the utilization of special tools for assembly and disassembly.

My invention eliminates all the shortcomings set forth above and does so without introducing any others. Thus, I have devised an arrangement for maintaining a diaphragm seal in place which incorporates a snap together concept and comprises a retainer arranged to be hand assembled by forcing resilient elements thereof over protrusions located on a housing and disposed about the opening therein to be sealed, which retainer engages the periphery of the diaphragm seal so as to make it a prisoner between the housing and the retainer.

It is, therefore, an object of the present invention to provide a diaphragm seal arrangement wherein the diaphragm seal can be secured in place by a retainer which is snap fastened to a portion of the device with which the diaphragm seal is associated.

These and other objects will become apparent from a reading of the following specification and appended claims in which:

FIG. 1 is a perspective explosion view of the elements of the invention including a diaphragm seal, an actuator and a housing with which it is to be associated and a retainer for securing the diaphragm seal to the housing;

FIG. 2 is an enlarged perspective view of the elements of FIG. 1 wherein the diaphragm seal is in place in the housing and the retainer is positioned for assembly with the diaphragm seal and the housing; and FIG. 3 is an enlarged perspective view of the arrangement of FIG. 2 where the diaphragm seal arrangement is completely assembled.

In FIG. 1, a housing 10, actuator 12, diaphragm seal 14 and retainer 16 are shown.

The housing 10, which may be formed of thermoplastic or thermoset material, is in the form of a cover of a casing, not shown, supporting, for example, a switch mechanism. The housing 10 includes a through bore 17 in which cylindrical portion 18 of the actuator 12 is arranged to be slidingly disposed for reciprocal movement so as to bring about actuation and deactuation of the switch mechanism, not shown.

A counterbore 20 is provided in the top suface of the housing 10, about the bore 17, to accept diaphragm seal 14. It will be noted that actuator 12 includes an undercut 22 between the cylindrical portion 18 and another cylindrical portion 24 in which the inner periphery of the diaphragm seal 14 formed by the opening 26 is arranged to be disposed in sealing engagement.

The retainer 16 is preferably formed of spring material. Ring portion 28 of the retainer 16 is arranged so when in place to overlie the outer periphery of the diaphragm seal 14. Four L-shaped spring fingers 30 are integrally formed and depend from the ring portion 28.

Disposed for association with the spring fingers 30 of the retainer 16 are four protrusions on the housing 10 each successively including a camming surface 32, an extension 34 and an undercut 36. The protrusions are located and integrally formed two to either side of the housing 10.

Referring now to FIG. 2, diaphragm seal 14 is shown disposed in the counterbore 20 of the housing 10 and extending thereabove a finite amount. The actuator 12 is shown in place with respect to the housing 10 and the diaphragm seal 14.

To maintain the diaphragm seal 14 in place, the retainer 16 is assembled to the housing 10 by forcing the L-shaped spring fingers 30 outwardly upon the lips 30a of the spring fingers engaging the cam surfaces 32, thereby allowing the spring fingers to pass the extensions 34, whereupon the spring fingers snap into and are secured in place by the undercuts 36.

The resulting assembly of the housing 10, actuator 12, diaphragm seal 14 and retainer 16 is shown in FIG. 3. It will be noted that the ring portion 28 of the retainer 16 overlies and engages the outer periphery of the diaphragm seal 14 and the lips 30a of the spring fingers 30 are located in the undercuts 36 of the housing 10 so that the diaphragm seal is maintained as a prisoner between the housing and the reatiner.

Should it be necessary to service the diaphragm seal 14, the lips 30a of the spring fingers 30 of the retainer 16 can be forced out of the undercuts 36 of the housing 10 by means of a screwdriver, for example, thereby allowing removal of the retainer 16 from the remainder of the arrangement.

From the foregoing, it will be appreciated I have provided a diaphragm seal arrangement which is easily formed and economically provided and which does not involve adhesive bonding, screw fasteners or contraction or expansion rings. Other forms of my invention are possible and therefore the scope of my invention should be determined from the following claims.

I claim:

1. A diaphragm seal arrangement: a housing having a mechanism therein and having a through bore in a wall thereof; an actuator disposed in said bore and engageable with said mechanism to cause actuation and de-actuation thereof upon movement of said actuator; a diaphragm seal disposed about the outer opening of said bore and arranged for engagement with said actuator; and means for securing the outer periphery of said diaphragm seal to said housing and about the said outer opening comprising a retainer and a retainer fastening portion associated with said housing, said retainer having at least one resilient element snap fastened to, by being forced over, corresponding protrusions of said retainer fastening portion so said retainer engages and overlies the outer periphery of said diaphragm seal thereby causing the outer periphery to be maintained as a prisoner between said housing and said retainer.

2. The arrangement of claim 1 wherein said retainer fastening portion is integrally formed with said housing.

3. The arrangement of claim 2 wherein each resilient element of said retainer comprises a spring finger and each protrusion of said retainer fastening portion includes a cam surface, an extension and an undercut with which the spring finger is successively associated during assembly so as to give rise to the snap fastening of the spring finger thereto.

4. The arrangement of claim 3 wherein each spring finger of the resilient element of said retainer and the corresponding cam surface and undercut of said housing are arranged so that assembly movement of said retainer with respect to said housing and said diaphragm seal takes place in a direction normal to the major plane of said seal.

* * * * *